(12) United States Patent
Yang et al.

(10) Patent No.: US 7,091,646 B1
(45) Date of Patent: Aug. 15, 2006

(54) MOTOR STRUCTURE

(75) Inventors: Ching Min Yang, Taipei Hsien (TW); Chin Hsun Chen, Taipei Hsien (TW)

(73) Assignee: Asia Vital Components Co., Ltd., Hsin Chuang (TW)

( * ) Notice: Subject to any disclaimer, the term of this patent is extended or adjusted under 35 U.S.C. 154(b) by 0 days.

(21) Appl. No.: 11/069,519

(22) Filed: Mar. 2, 2005

(51) Int. Cl.
*H02K 1/22* (2006.01)

(52) U.S. Cl. ..................................... 310/268; 310/266

(58) Field of Classification Search ............. 310/266, 310/268, 156.32–37, 254
See application file for complete search history.

(56) References Cited

U.S. PATENT DOCUMENTS

| | | | |
|---|---|---|---|
| 5,979,541 A | * 11/1999 | Saito | 165/80.3 |
| 6,531,799 B1 | * 3/2003 | Miller | 310/114 |
| 6,765,326 B1 | * 7/2004 | Nakazono et al. | 310/90 |
| 6,787,965 B1 | * 9/2004 | Horng et al. | 310/257 |

\* cited by examiner

*Primary Examiner*—Tran Nguyen
*Assistant Examiner*—Nguyen Hanh

(57) ABSTRACT

A motor structure comprises a rotor having a driving portion and a magnetic element; the magnetic element being assembled to a lower end of the driving portion; and a stator including an electrode sheet, a coil, and a seat; the coil winding around a stator flame assembling the seat; a magnetic induction portion being protruded from the electrode sheet; and the electrode sheet being installed to the seat. The rotor is pivotally installed to the stator and the magnetic induction portion of the electrode sheet is arranged corresponding to the magnetic element so that after conduction, the coil is interacted with the magnetic element by using phase differences therebetween.

6 Claims, 3 Drawing Sheets

MOTOR STRUCTURE

FIELD OF THE INVENTION

The present invention relates to motors, and in particular to the rotor and stator of a brushless motor structure, specifically the structures of the magnetic element and electrode sheet of a brushless motor is designed so that the brushless motor is thinner, lighter and have a higher operation efficiency.

BACKGROUND OF THE INVENTION

Currently, fans are classified into two types, axial fans, and centrifugal blower. The axial fans have lower cost with a larger volume. The centrifugal blowers have thinner bladders with higher density and have higher cost and great noises.

There are two kinds of fans are used in power devices. One is brushless motor and the other is carbon brush motor. In the brushless motor, the coil is wound around the stator and the rotor is assembled with magnetic elements, which are contrary to the conventional carbon brush motor. Thereby for the burshless motor, the rectifier needs not to contact the carbon brush for conducting the rotor coil and rectification. Under the condition of no brush, the absorption and repulsion of the conduction stator coils and rotor magnetic elements will induce the operation of the motor. Therefore, currently, the brushless motors are used as power sources of axial fans and centrifugal blowers.

With reference to FIG. 1, the prior art fan structure is illustrated. The fan has a rotor 11 and a stator 12. The rotor 11 has a driving portion 111 and a magnetic element 112. The magnetic element 112 is assembled to the axial fan 111c, transmission shaft 111d, and the hub 111f. A bearing 111e is assembled to the transmission shaft 111d.

The stator 12 includes an electrode sheet 121, a coil 122 and a seat 123. The electrode sheets 121 are assembled to the seat 123 and the coils 122 are wound around the stator flame 124 assembled on the seat 123.

Referring to FIG. 2, as illustrated in the drawing, the seat 123 is assembled to the frame 13. A circuit board 123a is assembled to the seat 123. In assembly, the magnetic element 112 is assembled in the hub 111f of the driving portion 111 and then the bearing 111e is assembled to a hollow chamber 123b in the seat 123. Then, the rotor 11 is pivotally installed to the stator 12 and the electrode sheets 121 are arranged corresponding to the magnetic element 112, but not contact with the magnetic element 112. Thereby after the coils 122 are conducted, stator 12 and rotor 11 will interact with one another.

However in above mentioned fan structure, since the arrangement of the magnetic element 112 and the electrode sheets 121, the thickness of the hub 111f cannot be reduced. However currently, the requirement of the fan is light, thin, short and small and has a larger capacity, while the prior art cannot achieve the object.

SUMMARY OF THE INVENTION

Accordingly, the primary object of the present invention is to provide a motor structure, wherein the structure causes a brushless motor is thinner, lighter and has higher operation efficiency.

To achieve above objects, the present invention provides a motor structure which comprises a rotor having a driving portion and a magnetic element; the magnetic element being assembled to a lower end of the driving portion; and a stator including an electrode sheet, a coil, and a seat; the coil winding around a stator flame assembling the seat; a magnetic induction portion being protruded from the electrode sheet; and the electrode sheet being installed to the seat. The rotor is pivotally installed to the stator and the magnetic induction portion of the electrode sheet is arranged corresponding to the magnetic element so that after conduction, the coil is interacted with the magnetic element by phase difference therebetween.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
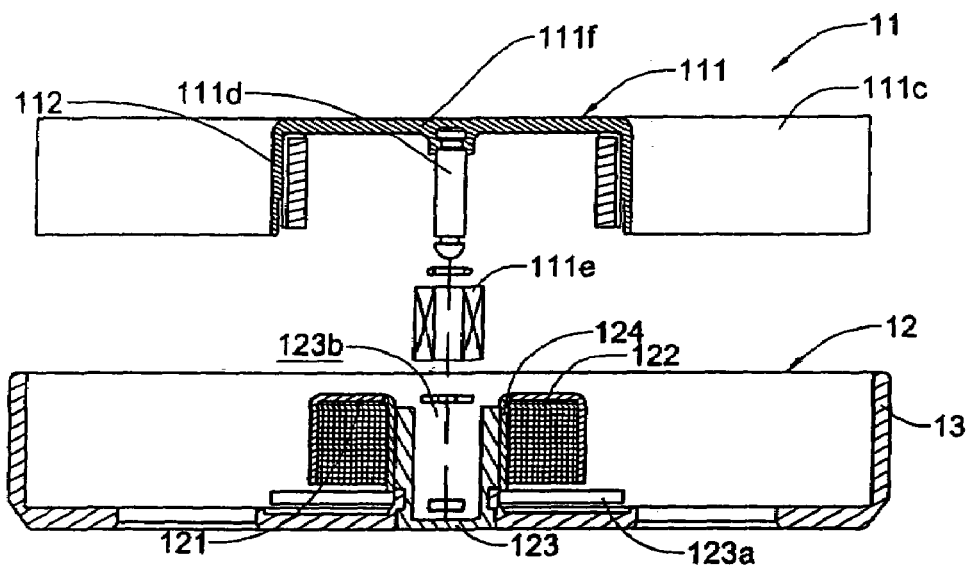
FIG. 1 is an exploded cross sectional view of the prior art fan.
Figure 2:
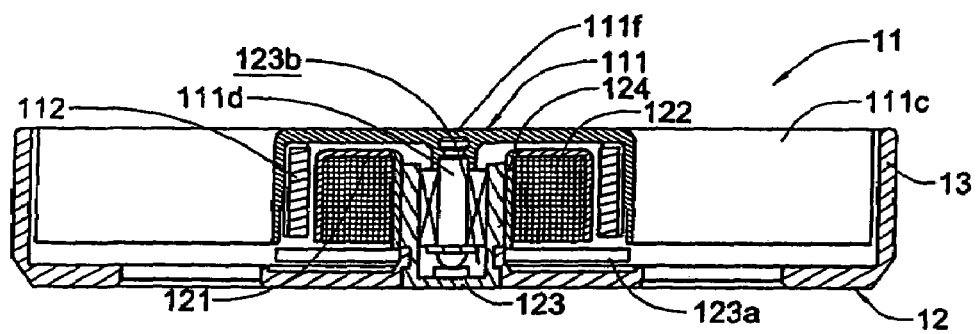
FIG. 2 is an assembled cross sectional view of the prior art fan.
Figure 3:
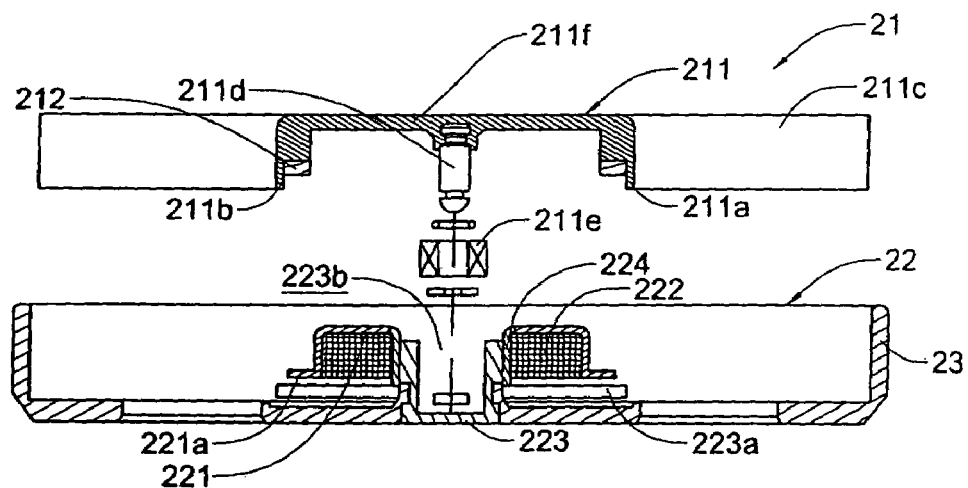
FIG. 3 is an exploded schematic view about the first preferred embodiment of the present invention.

With reference to FIG. 3, the structure about the first preferred embodiment of the present invention is illustrated. In that an axial fan is used as an example. The structure has the following elements.

A rotor 21 has a driving portion 211 and a magnetic element 212. An outer side of the driving portion 211 has a stepped shape including a first annular bottom and a second annular bottom. Normal directions of the first and second annular bottoms are parallel to an axial direction of the driving portion 211. The first annular bottom is at an inner side with respect to the second annular bottom. The magnetic element 212 is assembled to a lower end 211a of the driving portion 211. In this preferred embodiment, the driving portion 211 includes an axial fan 211c, a transmission shaft 211d and a hub 211f. A bearing 211e is assembled to the transmission shaft 211d.

A stator 12 is located below the rotor 21. The stator 12 includes an electrode sheet 221, a coil 222, and a seat 223. The electrode sheet 221 is installed at an upper side of the coil 22. The coil 222 winds around a stator flame 224 assembling the seat 223. A magnetic induction portion 221a is protruded from the electrode sheet 221. The electrode sheet 221 is installed to the seat 223.

Figure 4:
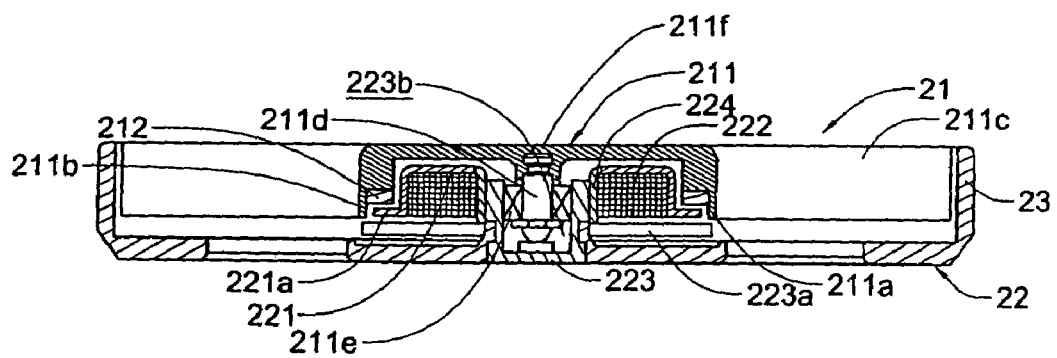
FIG. 4 is a schematic cross sectional view of the first preferred embodiment of the present invention.

Referring to FIG. 4, the seat 223 is connected to the frame 23. A circuit board 223a is installed on the seat 223. In assembly, a lower end 211a of the hub 211f of the driving portion 211 has a positioning groove 211b. The magnetic element 212 is installed to the positioning groove 211b of the hub 211f and then the bearing 211e is mounted on a hollow chamber 223b in the seat 223. Then, the rotor 21 is pivotally installed to the stator 22. Thereby the magnetic induction portion 221a of the electrode sheet 221 is arranged corresponding to the magnetic element 212, but is not in contact with the magnetic element 212 so that after the coil 222 is conducted, the coil 222 is interacted with the magnetic element 212 by phase difference therebetween.

Figure 5:
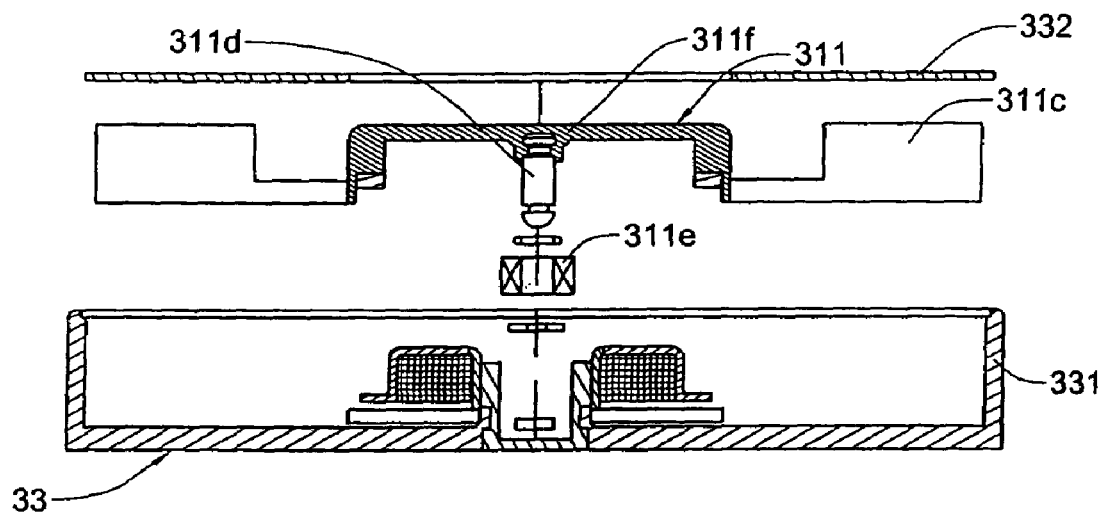
FIG. 5 is an exploded schematic view about the second embodiment of the present invention.
Figure 6:
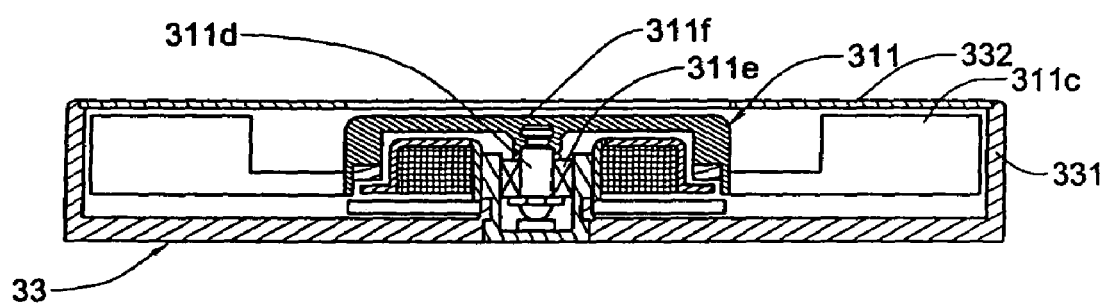
FIG. 6 is a schematic cross sectional view about the second preferred embodiment of the present invention.

Referring to FIGS. 5 and 6, the second preferred embodiment of the present invention is illustrated. It is illustrated that the present invention is used to a centrifugal blower. As illustrated, the driving portion 311 includes radiated blades 311c, a transmission shaft 311d and a hub 311f. A bearing 311e is installed on the transmission shaft 311d and the frame 33 includes a lower cover and an upper cover 332.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A motor structure comprising:
   a rotor having a driving portion and a magnetic element; an outer side of the driving portion having a stepped shape including a first annular bottom and a second annular bottom; normal directions of the first and second annular bottoms being parallel to an axial direction of the driving portion; and the first annular bottom being at an inner side with respect to the second annular bottom; the magnetic element being assembled to the first annular bottom of the driving portion;
   an axial fan installed at an outer periphery of the rotor; and
   a stator located below the rotor; the stator including an electrode sheet, a coil, and a seat; the electrode sheet being installed at an upper side of the coil; the coil winding around a stator frame assembling the seat; a magnetic induction portion being protruded from the electrode sheet; and the electrode sheet being installed to the seat;
   wherein the rotor is pivotally installed to the stator and the magnetic induction portion of the electrode sheet is at a lower side the magnetic element so that after conduction, the coil is interacted with the magnetic element by using phase differences therebetween.

2. The motor structure as claimed in claim 1, wherein a circuit board is assembled to the seat.

3. The motor structure as claimed in claim 1, wherein the driving portion includes a transmission shaft and a hub.

4. The motor structure as claimed in claim 3, wherein a bearing being assembled to the transmission shaft.

5. The motor structure as claimed in claim 1, wherein the driving portion includes a centrifugal blower, a hub and a transmission shaft.

6. The motor structure as claimed in claim 5, wherein a bearing is installed on the transmission shaft.

* * * * *